May 14, 1940.  W. DE VERTER  2,200,618
TUBE TESTING DEVICE
Filed June 23, 1937
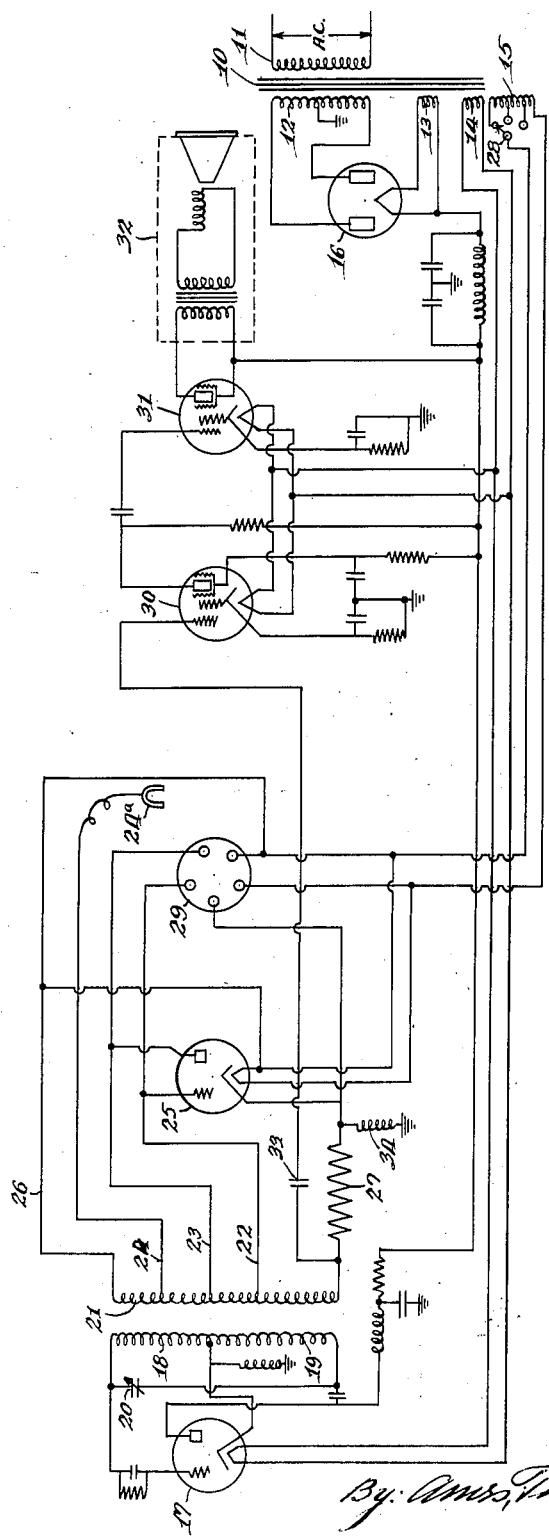

Patented May 14, 1940

2,200,618

UNITED STATES PATENT OFFICE 2,200,618

TUBE TESTING DEVICE

Walton De Verter, Chicago, Ill., assignor of one-third to Samuel L. Brenner, Chicago, Ill.

Application June 23, 1937, Serial No. 149,833

8 Claims. (Cl. 250—27)

My invention relates to radio tube testing devices, more particularly to noise detecting devices for indicating defects in radio tubes which tend to make the tubes noisy in use, and has for an object the provision of a simple, reliable, and inexpensive device of this character.

While various tube testing devices and methods have heretofore been employed, the large majority of such devices require precise adjustment of the various switches, condensers, and inductances utilized in the testing circuit during the testing operation, and it is accordingly a further object of my invention to provide a testing device by means of which the tube may be quickly and easily tested by one unskilled in the art simply by inserting the tube in a test socket.

A large percentage of the radio tubes in use function normally at high or radio frequencies, and I have found that high frequency current is the most advantageous medium for detecting defects in radio tubes. In my co-pending application which resulted in Patent No. 2,103,450, dated Dec. 28, 1937, entitled Tube testing device, I have described and broadly claimed a tube testing device and a method for testing tubes in which the tube undergoing test is utilized as a rectifier to provide a substantially constant load on a high frequency oscillator, so that defects in the tube are detected by causing variations in the load on the oscillator to cause modulation of the high frequency current, the modulations being transmitted to a suitable indicator. In the specific embodiment disclosed in my said co-pending application, the oscillator circuit is coupled to a suitable audio amplifier which transmits to a loud speaker the modulated high frequency currents.

In carrying out the present invention which embodies the broad principles of the invention disclosed and claimed in my said co-pending application, I arrange the tube to be tested in a testing circuit which includes a resistance, and I excite the testing circuit with high frequency energy so that the tube acts as a rectifier to cause rectified current to flow through the resistance, the rectified current causing a voltage drop across the resistance, the value of which is caused to fluctuate by defects in the tube. In order suitably to indicate the presence of defects in the tube, I provide an amplifier circuit controlled by the voltage across the resistance for amplifying and transmitting to a suitable signalling device the voltage fluctuations.

For a more complete understanding of my invention, reference may now be had to the drawing, the single figure of which represents a circuit diagram of a tube testing device embodying my invention.

Referring now to the drawing, I have shown my invention as applied to a tube testing device comprising a suitable transformer 10 having a primary winding 11 adapted to be connected to any suitable source of alternating current energy, and a plurality of secondary windings 12, 13, 14, and 15 respectively. Associated with the secondary winding 12 of the transformer 10 is a rectifier tube 16, the output circuit of which is connected to the input circuit of an oscillator tube 17, the cathode of the rectifier tube 16 being connected, as illustrated, in a heating circuit which includes the secondary winding 13 of the transformer 10.

Associated with the oscillator tube 17 I provide an oscillator coil having an upper portion 18 and a lower portion 19 connected in the conventional manner through appropriate circuits with the oscillator tube, the lower portion 19 of the oscillator coil being connected in the anode-cathode circuit of the oscillator tube, and the upper portion 18 of the oscillator coil being connected to the grid of the oscillator tube, as shown, so as to provide a continuous oscillation whereby a high frequency current is generated in the oscillator coil. As shown, the filament of the oscillator tube 17 is connected for energization from the secondary winding 14 of the transformer 10, and a variable condenser 20 is connected across the oscillator coil to provide for proper tuning of the oscillator circuit, as will be more fully described hereinafter.

Inductively related to the oscillator coil for energization by the high frequency current generated therein, I provide a testing circuit which includes a tapped inductance 21 having a plurality of tap connections 22, 23, and 24, respectively, for connecting predetermined portions of the coil 21 in circuit with the various elements of a tube 25 which is to be tested. As shown, the upper end of the inductance coil 21 is connected by a conductor 26 to the filament of the tube 25, while the tap connections 23 and 22 extend respectively to the plate and the grid of the tube 25, the cathode of the tube 25 being connected to the lower end of the inductance coil 21 through a resistance 27. It will thus be seen that the cathode and the grid of the tube 25 are connected as a two-element rectifier in circuit with a portion of the coil 21 so that rectified high frequency current is caused to flow through the resistor 27. The cathode and the plate of the tube 25 are similarly connected across another portion of the coil 21 and the cathode and the filament are connected across the entire coil 21 in a similar manner. By means of this arrangement predetermined high frequency potentials are applied to the various elements of the tube being tested, the maximum potential being applied between the cathode and filament, as leakage between these two points is the most common source of noise in radio tubes. It will, of course, be understood that the connections of the tube elements to the tapped coil may be varied in any desired manner so long as each of the other elements cooperates with the cathode to provide a rectifier. Thus the grid, plate, or filament may be connected to any desired tap on the coil 21.

It will be apparent now that when high frequency current is supplied to the testing circuit by the oscillator, a rectified current is caused to flow through the resistor 27 which is equal to the sum of the rectified currents flowing in the individual circuits in which the various tube elements are connected, the resistance 27 being in series circuit relation with the cathode and being common to the individual circuits of the other tube elements. Thus, a voltage drop across the resistance 27 is produced which is proportional to the value of the rectified current flowing therethrough, and any defect in the tube 25 such, for example, as leakage between the elements or mechanical instability of any of the elements, will effect a change in the rectified current so as to cause fluctuations in the voltage drop across the resistance 27. As shown, the filament of the tube 25 is connected for energization from the secondary winding 15 of the transformer 10, the filament circuit being provided with a suitable switch 28 to provide a variable heating current. It will of course be understood that this switch 28 is not essential in carrying out my invention.

The tube 25, as will be understood by those skilled in the art, is connected in the testing circuit by means of a suitable testing socket, not shown, and if desired a plurality of testing sockets suitably connected to the inductance coil 21 may be provided. For purposes of illustration I have shown one additional testing socket 23 connected to the inductance coil 21, the tap connection 24 providing a connector 24a for the usual top contact of such tubes as have an upper grid terminal.

In order to sensibly indicate the presence of defects in the tube undergoing testing, I provide an audio amplifier circuit for transmitting fluctuations in the voltage across the resistance 27 to a suitable signalling device. As shown, the amplifier circuit includes a pair of amplifier tubes 30 and 31 connected in the usual manner with a loud speaker 32 so as to provide two-stage amplification, the amplifier tubes 30 and 31 being connected in the conventional manner for energization from the rectifier tube 16, the heating filaments of the tubes being connected to the secondary winding 14 of the transformer 10.

As indicated above, the audio amplifier circuit is arranged to amplify the variations in voltage across the resistor 27 and to energize the loud speaker 32 in accordance with these voltage fluctuations. Accordingly, the control element or grid of the tube 30, which constitutes the first stage of amplification, is connected through a condenser 33 to one side of the resistor 27, the other side of the resistor being connected through a choke coil 34 to ground so that the potential of each of the control elements of the tube 30, with respect to the cathode of the tube 30, varies in accordance with the voltage across the resistance 27.

In describing the operation of my improved testing device, it will be assumed that the primary winding 11 of the transformer 10 is connected to a suitable source of alternating current, and that accordingly the proper voltages are applied to the oscillator tube 17 and the amplifier tubes 30 and 31 through the secondary windings 12, 13, and 14, and the rectifier tube 16. The tube 25 may now be inserted in its test socket so that it is connected in the testing circuit, as shown, and the filament of the tube 25 may be heated to approximately its normal operating temperature by adjusting the voltage-varying switch 28.

The oscillator now supplies high frequency energy to the testing circuit, and in order to provide for maximum sensitivity and to compensate for differences in the interelectrode capacities of the tube 25, I have found it desirable to tune the oscillator circuit and the testing circuit so that a condition of resonance exists therebetween. This tuning may of course be accomplished by adjusting the variable condenser 20. While I have shown the variable condenser 20 as connected across the entire oscillator coil, it will of course be apparent that a similar condenser may be provided connected across only a portion of the oscillator coil, or if desired a variable condenser may be provided associated with a portion or all of the inductance coil 21. Likewise, a fixed condenser may be used and a variable inductance may be provided in circuit with either the oscillator coil or the inductance coil 21.

When the oscillator and testing circuits have been tuned to resonance, it will be apparent that a high frequency current flows through the tube 25 and that each element of the tube except the cathode acts as an anode to provide a plurality of half-wave rectifiers, so that a rectified high frequency current flows through the resistance 27. In the absence of defects in the tube 25, the current flowing through the resistance 27 will be substantially constant and accordingly the voltage drop thereacross, which voltage drop is applied to the control element or grid of the tube 30, is likewise substantially constant. Therefore, the energization of the loud speaker 32 will be such as to cause no noise other than the usual slight hum or hiss.

If, however, any defect exists in the tube 25, such, for example, as irregular electron emission, mechanical vibration or touching of the tube elements, faulty internal connections or leakage between the elements, the rectified current flowing through the resistance 27 will be varied and accordingly fluctuations will occur in the voltage across the resistance 27 so as to apply to the control element or grid of the amplifier tube 30 a fluctuating control potential. This fluctuating potential is of course amplified by the audio amplifier and made audible by the loud speaker 32. It will be apparent that the fluctuations may be made visible, if desired, by means of a suitable indicating device such as a cathode ray tube.

In accordance with the usual practice, the tube being tested may be struck gently with the finger or with a small rubber hammer, so that if any of the elements are loose or capable of being vibrated, a fluctuation in the rectified current will be produced which will cause an audible sound in the loud speaker.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A tube testing device for a tube having a plurality of electrodes including a cathode, said device comprising a high frequency oscillator, a testing circuit including an element coupled to said oscillator for energization thereby, said testing circuit also including means for connecting the cathode of the tube to be tested in series circuit relation with another electrode of said tube across said element so as to rectify the high frequency current flowing in said series circuit, a resistance connected in said series circuit whereby the rectified current in said series circuit causes a voltage drop across said resistance the value of which is caused to fluctuate by defects in said tube, and means for sensibly identifying fluctuations in the value of said voltage.

2. A tube testing device for a tube having a plurality of electrodes including a cathode, said device comprising a high frequency oscillator, a testing circuit including an element coupled to said oscillator for energization thereby, said testing circuit also including means for connecting the cathode of the tube to be tested in series circuit relation with another electrode of said tube across said element so as to rectify the high frequency current flowing in said series circuit, a resistance connected in said series circuit whereby the rectified current in said series circuit causes a voltage drop across said resistance the value of which is caused to fluctuate by defects in said tube, an audio-amplifier connected to amplify said voltage fluctuations, and an audible signaling device associated with said amplifier to indicate the existence of defects in said tube.

3. A tube testing device for a tube having a plurality of electrodes including a cathode, said device comprising a high frequency oscillator, a testing circuit including an element coupled to said oscillator for energization thereby, said testing circuit also including means for connecting the cathode of the tube to be tested in series circuit relation with another electrode of said tube across said element so as to rectify the high frequency current flowing in said series circuit, a resistance connected in said series circuit whereby the rectified current in said series circuit causes a voltage drop across said resistance the value of which is caused to fluctuate by defects in said tube, an audio-amplifier having a control element, means for energizing said control element in accordance with the voltage across said resistance to control the output of said amplifier, and audible signaling means connected in the output circuit of said audio-amplifier to indicate the existence of defects in said tube.

4. A tube testing device for a tube having a plurality of electrodes including a cathode, said device comprising a high frequency oscillator, a testing circuit including an inductance coupled to said oscillator, means for tuning said oscillator and said testing circuit to resonate whereby said testing circuit is variably energized by said oscillator, said testing circuit also including means for connecting the cathode of the tube to be tested in series circuit relation with another electrode of said tube across said element so as to rectify the high frequency current flowing in said series circuit, a resistance connected in series circuit whereby the rectified current in said series circuit causes a voltage drop across said resistance the value of which is caused to fluctuate by defects in said tube, and means for sensibly identifying fluctuation in the value of said voltage.

5. A tube testing device for a tube having a plurality of electrodes including a cathode, said device comprising a high frequency oscillator, a testing circuit including an inductance coupled to said oscillator, means for tuning said oscillator and said testing circuit to resonate whereby said testing circuit is variably energized by said oscillator, said testing circuit also including means for connecting the cathode of the tube to be tested in series circuit relation with another electrode of said tube across said element so as to rectify the high frequency current flowing in said circuit, a resistance connected in said series circuit whereby the rectified current in said series circuit causes a voltage drop across said resistance the value of which is caused to fluctuate by defects in said tube, amplifying means including an audible signaling device, and means for coupling said amplifying means for energization in accordance with the voltage fluctuation across said resistance, whereby said signaling means indicates the presence of defects in said tube.

6. A tube testing device comprising a high frequency oscillator, a testing circuit including a tapped inductance coil coupled to said oscillator, means for connecting the individual elements of a tube to be tested to selected taps on said coil for energization at predetermined high frequency potentials, each element of said tube being connected to operate as a rectifier in conjunction with the cathode of said tube, a resistance connected in series circuit relation with the cathode of said tube whereby the rectified high frequency current flowing in each of the rectifier circuits of said tube flows through said resistance to cause a voltage drop thereacross the value of which is caused to fluctuate by defects in said tube, and means for sensibly identifying fluctuations in the value of said voltage.

7. A tube testing device comprising a high frequency oscillator, a testing circuit including a tapped inductance coil coupled to said oscillator, means for connecting the individual elements of a tube to be tested to selected taps on said coil for energization at predetermined high frequency potentials, each element of said tube being connected to operate as a rectifier in conjunction with the cathode of said tube, a resistance connected in series circuit relation with the cathode of said tube whereby the rectified high frequency current flowing in each of the rectifier circuits of said tube flows through said resistance to cause a voltage drop thereacross the value of which is caused to fluctuate by defects in said tube, means for amplifying said voltage fluctuations, and a loud-speaker connected to said amplifying means for indicating audibly the existence of defects in said tube.

8. A tube testing device comprising a high frequency oscillator, a testing circuit including a tapped inductance coil coupled to said oscillator, means for connecting the individual elements of a tube to be tested to selected taps on said coil for energization at predetermined high frequency potentials, each element of said tube being connected to operate as a rectifier in conjunction with the cathode of said tube, means for causing said oscillator to resonate with said testing circuit, a resistance connected in series circuit relation with the cathode of said tube whereby the rectified high frequency current flowing in each of the rectifier circuits of said tube flows through said resistance to cause a voltage drop thereacross the value of which is caused to fluctuate by defects in said tube, and means for sensibly identifying fluctuations in the value of said voltage.

WALTON DE VERTER.